Patented Mar. 15, 1932

1,849,576

UNITED STATES PATENT OFFICE

WALTER KARRER, OF BASEL, SWITZERLAND, ASSIGNOR TO HOFFMANN-LA ROCHE INC., OF NUTLEY, NEW JERSEY, A CORPORATION OF NEW JERSEY

GLUCOSIDE OF ADONIS VERNALIS L. AND PROCESS FOR MAKING SAME

No Drawing. Application filed February 9, 1927, Serial No. 167,069, and in Germany February 13, 1926.

It is known that various species of Adonis, for instance Adonis vernalis L., contain one or more glucosides, which in respect to their physiological action have a similarity in physiological action to the cardio-tonic substances derived from Digitalis purpurea and Scilla maritima. Up to the present time, however, a highly efficacious preparation could not be obtained from Adonis vernalis or from the drug Herba adonis vernalis. Thus, for instance, the commercial Adonidin, which is a brown hygroscopic powder, contains only about 40000 frog units per gramme. The purest product which has yet been prepared is described by Cervello (Archiv für Experimentelle Pathologie & Pharmakologie, vol. 15, 1882, page 235). Its efficacy, however, probably does not exceed 200000 frog units per gramme.

It has now been found that the glucoside can be obtained in a much purer form if aqueous or alcoholic extracts of the drug are mixed with a suitable adsorbing agent, for instance animal charcoal, which adsorbs the glucoside without adsorbing certain impurities from which it has been impossible heretofore to separate the glucoside. The charcoal containing the glucoside is then filtered from the aqueous or alcoholic extract. The glucoside is obtained from the charcoal by extraction with organic solvents, and the resulting solution separated from the charcoal. By this means a good yield of a pure product is obtained. It is often desirable to add lead acetate to the initial glucoside extract to remove certain impurities. The mixture is then filtered to remove the insoluble substances, and the adsorption process carried out. According to the present invention the glucoside is obtained through further purification as a non-hygroscopic powder, varying in shade from a light brown to a practically colourless one. It is soluble in alcohol, water and chloroform, but insoluble in ether or petroleum-ether. Its efficacy is equal to 5–600000 frog units per gramme, i. e., about 15 times the efficacy of commercial Adonidin.

The glucoside can be purified in various ways, always keeping in mind that it must be freed of fat and waxy substances. This can be done very effectively by treating the adsorbing agent, animal charcoal, with ether. The fat and waxy substances which have been adsorbed are thereby dissolved, whilst the glucoside remains in such agent. If it be not intended to prepare the glucoside in solid form, the extract obtained after the elimination of the adsorbent can be separated from the extracting agent and the residue thus obtained shaken up with ether and water. In this way a highly purified aqueous solution is obtained which can be used as such; owing to its very small residue it may also be used for injection.

Example 1

1 part of finely cut up Herba adonis vernalis is stirred together with 15 parts of water at normal temperature. The mixture is filtered through a straining cloth, the residue pressed out and the aqueous extract cleared by filtration or centrifuging. To the solution thus obtained 0.2–0.3 parts of animal charcoal are slowly added while stirring and the stirring is continued for 2 hours. On being allowed to stand the charcoal will after a short time have settled and the overstanding water, which no longer contains any glucoside, can easily be drawn off. The charcoal is separated from the fluid by means of a Buchner's funnel, washed with a little water and dried at normal temperature in the air. From the charcoal the glucoside is completely extracted in a soxhlet during several days with dry hot chloroform. After distilling the chloroform, a thick brown oil remains. This is shaken with ether and 0.1 part of water, whereby the active glucoside remains in the water and the fatty substances are taken up with the ether. The aqueous solution is separated from the ether and twice shaken with fresh ether. The aqueous solution thus obtained can be diluted with water and standardized to a required physiological efficacity. A solution containing 1000 frog units in 1 cc. is nearly colourless and possesses a residue of only 0.002–0.003 grammes per cc.

Example 2

1 part of finely cut up Herba adonis vernalis is extracted with 15 parts of 40% alcohol. After filtration the alcohol is distilled from the filtrate and lead acetate is added to the aqueous solution for the purpose of removing tannin, coloring matter, and colloidal substances which remains. The aqueous extract treated in this manner is filtered, then the liquid is stirred together with 0.2 part of animal charcoal. The charcoal is separated from the aqueous liquid, dried, and the dried charcoal adsorbate is then extracted with chloroform, as described in Example 1. The chloroform extract is evaporated to a small volume, and this concentrated chloroform-solution poured into petrol-ether. The cardio-active glucoside separates from the mixture as a thick oil which is then decanted from the petroleum ether, whereas only the inactive substances are taken up by the petrol-ether. After drying in vacuo the oil contains per gramme 4–500000 frog units. If this residue is stirred with water and the aqueous solution is dried in vacuo, a non-hygroscopic, slightly brown coloured powder is obtained, which is easily soluble in water and contains 5–600000 frog units per gramme.

I claim:

1. As a new article of manufacture, a glucoside of Adonis vernalis L. substantially free from fatty and waxy ingredients, said glucoside being a non-hygroscopic powder, varying in color from practically colorless to light brown, soluble in alcohol, water and chloroform, insoluble in ether or petroleum ether, and having an efficacy of 500,000 to 600,000 frog units per gram.

2. In the process for the manufacture of a glucoside of Adonis vernalis L., the steps of extracting the glucoside of Adonis vernalis L from a raw material containing said glucoside with aqueous alcohol, adding animal charcoal to the extract to adsorb the glucoside from said extract, separating the glucoside containing charcoal from the aqueous alcohol, extracting the glucoside from said charcoal by chloroform, concentrating the chloroform solution, adding the concentrated chloroform solution to petroleum ether, whereby the glucoside separates out of the mixture, and removing the glucoside from said mixture.

3. A process as in claim 2, in which the glucoside is further purified by the addition of water and ether, whereby fatty impurities are dissolved in the ether and the glucoside is dissolved in the water, and separating the ether solution from the water containing said glucoside.

In witness whereof I have hereunto set my hand.

WALTER KARRER.